US011776136B1

(12) United States Patent
Pachikov et al.

(10) Patent No.: US 11,776,136 B1
(45) Date of Patent: Oct. 3, 2023

(54) MOBILE SECURITY CAMERA WITH MULTIPLE LANDING LOCATIONS

(71) Applicant: Sunflower Labs Inc., San Carlos, CA (US)

(72) Inventors: Alexander S. Pachikov, San Carlos, CA (US); Christian Eheim, Fällanden (CH); Phil Libin, San Francisco, CA (US)

(73) Assignee: Sunflower Labs Inc., San Carlos, CA (US)

( * ) Notice: Subject to any disclaimer, the term of this patent is extended or adjusted under 35 U.S.C. 154(b) by 346 days.

(21) Appl. No.: 16/995,942

(22) Filed: Aug. 18, 2020

Related U.S. Application Data (60) Provisional application No. 62/892,173, filed on Aug. 27, 2019.

(51) Int. Cl.
| | | |
|---|---|---|
| *G06T 7/246* | (2017.01) | |
| *B64C 39/02* | (2023.01) | |
| *B64F 1/00* | (2006.01) | |
| B64D 47/08 | (2006.01) | |
| B64U 101/30 | (2023.01) | |

(52) U.S. Cl.
CPC ............ *G06T 7/246* (2017.01); *B64C 39/024* (2013.01); *B64F 1/007* (2013.01); *B64D 47/08* (2013.01); *B64U 2101/30* (2023.01)

(58) Field of Classification Search
CPC ....... B64C 39/024; B64C 27/08; B64C 39/02; B64C 2201/127; B64C 2201/024; B64D 47/08; B64F 1/007; B64F 1/18
See application file for complete search history.

(56) References Cited

U.S. PATENT DOCUMENTS

| | | | | |
|---|---|---|---|---|
| 9,387,928 | B1 * | 7/2016 | Gentry | B60L 53/00 |
| 9,494,936 | B2 * | 11/2016 | Kerzner | G08B 15/005 |
| D774,941 | S * | 12/2016 | Lupashin | G08G 5/003 |
| | | | | D12/16.1 |
| 10,607,461 | B2 * | 3/2020 | Williams | A61K 31/519 |
| 10,836,270 | B2 * | 11/2020 | Resnick | B64D 1/12 |
| 2013/0206919 | A1 * | 8/2013 | Shachor | B64F 1/12 |
| | | | | 244/23 A |
| 2016/0039300 | A1 * | 2/2016 | Wang | B64C 39/024 |
| | | | | 244/58 |
| 2016/0266579 | A1 * | 9/2016 | Chen | G08G 5/0052 |

(Continued)

*Primary Examiner* — Michael H Wang
(74) *Attorney, Agent, or Firm* — Muirhead and Saturnelli, LLC (57) ABSTRACT

Using at least one mobile security camera to monitor multiple locations includes providing a plurality of landing platforms for the at least one mobile security camera, positioning the at least one mobile security camera at a particular one of the landing platforms in response to the particular one of the landing platforms being a preferred location of the at least one mobile security camera, and moving the at least one mobile security camera from a preferred location to follow a detected object. Using at least one mobile security camera to monitor multiple locations may also include returning the mobile security camera to the particular one of the landing platforms after the at least one mobile security camera follows the detected object. The at least one mobile security camera may perform static monitoring from the first one of the landing platforms and the second one of the landing platforms.

20 Claims, 5 Drawing Sheets

(56) References Cited

U.S. PATENT DOCUMENTS

| | | | |
|---|---|---|---|
| 2017/0050749 A1* | 2/2017 | Pilskalns | B64F 1/362 |
| 2017/0217323 A1* | 8/2017 | Antonini | B60L 53/14 |
| 2017/0227965 A1* | 8/2017 | Decenzo | G05D 1/0094 |
| 2017/0330466 A1* | 11/2017 | Demetriades | G08G 5/0086 |
| 2018/0009549 A1* | 1/2018 | Sullivan | B64F 1/362 |
| 2018/0105289 A1* | 4/2018 | Walsh | A47G 29/141 |
| 2018/0233007 A1* | 8/2018 | Williams | A61K 45/06 |
| 2021/0066913 A1* | 3/2021 | Syracuse | G08G 5/003 |
| 2021/0173414 A1* | 6/2021 | Starr | B64F 1/362 |
| 2021/0179290 A1* | 6/2021 | Falk-Petersen | B64F 1/007 |

* cited by examiner

MOBILE SECURITY CAMERA WITH MULTIPLE LANDING LOCATIONS

CROSS-REFERENCE TO RELATED APPLICATIONS

This application claims priority to U.S. Prov. App. No. 62/892,173, filed on Aug. 27, 2019, and entitled "MOBILE SECURITY CAMERA WITH MULTIPLE LANDING LOCATIONS", which is incorporated herein by reference.

TECHNICAL FIELD

This application is directed to the field of security application of autonomous aerial vehicles with mounted cameras, and more particularly to use of one or several autonomous aerial devices with multiple landing platforms distributed across a property.

BACKGROUND OF THE INVENTION

According to the recent Census data, there are approximately 76 million free-standing, single family homes in the US, almost 56 million of which are in lightly populated areas, outside of city centers and dense urban environments. Only 30 percent of the homes in lightly populated areas currently have any kind of a home security system. In response to increased concerns about general and residential security, the market for home security systems is growing at an accelerated pace.

Mainstream and advanced technology solutions for home security systems are shaped by several trends:

- Video surveillance market based on CCTV systems and cameras is growing at a healthy rate: according to recent market research, the home security cameras market is expected to approach 10 billion dollars by 2023, growing on average at 9.1 percent annually and more than doubling unit sales from 54 million in 2018 to 120 million in 2023, with pricing becoming increasingly attractive.
- Various types of sensors, especially motion and vibration sensors, show significant promise as components of home security systems. Motion sensors are capable of detecting intruders and, in combination with the state-of-the-art processing and artificial intelligence techniques, may recognize various types of objects and accurately assess risk levels. Market size for home security sensors is expecting to exceed seven billion dollars by 2023, growing on average at 11 percent annually.
- Advanced home security systems, such as developed by Sunflower Labs, include multiple sensor units, each with motion and vibration sensors and wireless connectivity, communicating with a central station and a cloud service, deployed across a residential property and constantly monitoring various types of objects, appearing on the territory or approaching the territory.
- Forward-looking designs of home security systems created by Sunflower Labs, Nightingale Security and other vendors, increasingly employ various types of mobile camera-enabled vehicles, especially Unmanned Aerial Vehicles (a.k.a. UAVs, drones, multicopters). Such UAVs typically have landing platforms on the property and may be used for selective, periodic or continuous patrolling of a property and may be dispatched on demand to inspect a particular situation or object(s) when the sensor portion of the system has detected a significant security risk, etc.

UAV markets are quickly expanding worldwide. In the US, a significant growth is following the creation by FAA of a regulatory framework for consumer and commercial drones. According to recent industry forecasts, worldwide shipments of consumer drones are expected to almost double from 34.5 million units in 2019 to 67.7 million units in 2021. Security applications, including home security, represent a growing market segment for UAVs.

Wireless and WAN connectivity of all components of innovative home security systems allow cloud and mobile deployments of the components and constant communications with property owners and security personnel for notifications, inquiries and decision-making.

Notwithstanding significant advances in design, architecture, hardware and software base and functionality of the new generation of home security systems, many questions are waiting for their answers. In particular, solutions where cameras, sensor units, UAVs, computers and networking equipment are combined into a comprehensive solution require significant improvements with respect to tradeoffs and optimization of complexity, reliability and economics.

Accordingly, it is desirable to design a compact and powerful home security system, combining new ideas and components with economic, flexible and easily manageable solution.

SUMMARY OF THE INVENTION

According to the system described herein, using at least one mobile security camera to monitor multiple locations includes providing a plurality of landing platforms for the at least one mobile security camera, positioning the at least one mobile security camera at a particular one of the landing platforms in response to the particular one of the landing platforms being a preferred location of the at least one mobile security camera, and moving the at least one mobile security camera from a preferred location to follow a detected object. Using at least one mobile security camera to monitor multiple locations may also include returning the at least one mobile security camera to the particular one of the landing platforms after the at least one mobile security camera follows the detected object. Using at least one mobile security camera to monitor multiple locations may also include returning the at least one mobile security camera to a closest one of the landing platforms after the at least one mobile security camera follows the detected object. Using at least one mobile security camera to monitor multiple locations may also include moving the at least one mobile security camera from a first one of the landing platforms to a second one of the landing platforms according to an alternation schedule. The at least one mobile security camera may perform static monitoring from the first one of the landing platforms and the second one of the landing platforms. At least one of the landing platforms may include a charger that cooperates with a charging mechanism on the at least one mobile security camera. The at least one mobile security camera may land at different ones of the plurality of landing platforms to charge before taking flight again. The at least one mobile security camera may include a landing spike on a bottom portion thereof, the landing spike including the charging mechanism. The landing platforms may include a funnel that accommodates the landing spike. At least one of the landing platforms may be mounted on a mounting plate that is mounted on a roof of a building. The at least one mobile security camera may include motor components with the supports that rotate to rest in grooves of the at least one mobile security camera. The landing platforms may include slots for the motor components.

According further to the system described herein, a non-transitory computer-readable medium contains software that uses at least one mobile security camera to monitor multiple locations. Each of the locations has a landing platform for the at least one mobile security camera. The software includes executable code that positions the at least one mobile security camera at a particular one of the landing platforms in response to the particular one of the landing platforms being a preferred location of the at least one mobile security camera and executable code that moves the at least one mobile security camera from a preferred location to follow a detected object. The software may also include executable code that returns the at least one mobile security camera to the particular one of the landing platforms after the at least one mobile security camera follows the detected object. The software may also include executable code that returns the at least one mobile security camera to a closest one of the landing platforms after the at least one mobile security camera follows the detected object. The software may also include executable code that moves the at least one mobile security camera from a first one of the landing platforms to a second one of the landing platforms according to an alternation schedule. The at least one mobile security camera may perform static monitoring from the first one of the landing platforms and the second one of the landing platforms. At least one of the landing platforms may include a charger that cooperates with a charging mechanism on the at least one mobile security camera. The at least one mobile security camera may land at different ones of the plurality of landing platforms to charge before taking flight again. The at least one mobile security camera may include a landing spike on a bottom portion thereof, the landing spike including the charging mechanism. The landing platforms may include a funnel that accommodates the landing spike. At least one of the landing platforms may be mounted on a mounting plate that is mounted on a roof of a building. The at least one mobile security camera may include motor components with the supports that rotate to rest in grooves of the at least one mobile security camera. The landing platforms may include slots for the motor components.

The proposed system combines functionality of UAVs and stationary cameras by deploying one or multiple mobile security cameras and landing platforms across a property. Mobile security cameras with potentially foldable motor supports may perform various functions, such as:

Flying around the property and/or between landing platforms for the surveillance purpose, including surveillance on demand based on a detected presence of potential intruders or other objects that may damage the property.

Serving as static security cameras when parked on the landing platforms and changing landing locations based on schedules or on demand.

A mobile security camera may include the following parts:

1. An elliptic body with grooves for motor supports (arms) and a camera on a side of the body;
2. Motor compartments mounted on supports that may rotate downwards to slide into corresponding grooves during landing and upwards to put the camera into the flying position; and
3. A landing spike—a cone-shaped bottom part with a charging mechanism that slides into an opening in the landing platform, connects with the platform-based charger when the mobile security camera is parked and may be held by a reciprocal locking mechanism in the landing platform to withstand strong winds.

A landing platform may have the following components:

1. A funnel in the center, directing the descending mobile security camera until the mobile security camera stops in the bottom position and a charging mechanism of the mobile security camera is aligned and connected with the charger in the bottom part of the platform, described, for example, in U.S. patent application Ser. No. 16/025,393 to Pachikov, et al. filed on Jul. 2, 2018 and titled: "MULTICOPTER THREE-PHASE PRECISION AUTO-LANDING", which is incorporated by reference herein;
2. Grooves on the sides for motor supports where the grooves on the sides of the mobile camera are aligned with the grooves of the landing platform to allow further rotation of motor supports downwards or upwards;
3. Slots for motor compartments where the motors rest when the mobile camera is parked;
4. A locking mechanism, such as a ball with an opening pushed out to hold the landing spike in place and relaxed when the mobile camera needs to take off;
5. An optional cover to protect the landing platform and the resting mobile security camera from bad weather, dust, falling leaves, etc.; and
6. Landing platforms that can be installed in multiple locations across a property, for example, on roof slopes and rooftops, where mounting platforms may be used, raised on one side on roof slopes and otherwise adjusted for uneven surfaces where landing position of a mobile security camera in each location may be chosen to provide for the best viewing capability and angle for the camera.

There are three useful configurations and scenarios of using the proposed mobile security cameras with landing platforms:

A. Single mobile security camera, single landing station

In the static position, when the mobile security camera rests on the landing platform, the mobile security camera has all the capabilities of a mounted stationary camera. Additionally, the mobile security camera may fly out to get a better look of unknown objects, perform a security sweep and episodic patrolling or following a target.

B. Multiple mobile security cameras, multiple landing stations

Several pairs of mobile security cameras and landing stations are placed in different locations on a property to enhance the functionality of the previous mode by providing better coverage, faster reaction and redundancy. For example, a single mobile security camera mode may protect a front entry to a home, while a multiple mobile security camera mode with three pairs of units may additionally protect a back entry and a side window of the home.

C. Single mobile security camera, multiple landing stations

For large properties such as a factory, a mine or a pipeline that require periodic patrols, landing stations may be mounted in different locations and the mobile security camera may accordingly land in different locations and recharge along the way. An additional portion of usage scenario for this configuration may include periodic, scheduled or random relocation of the mobile security camera to serve as a surveillance camera for different parts of the property.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein delivers one or multiple mobile security cameras and landing platforms across a property, where mobile security cameras with potentially foldable motor supports may perform various surveillance, monitoring and relocation functions.

Figure 1:
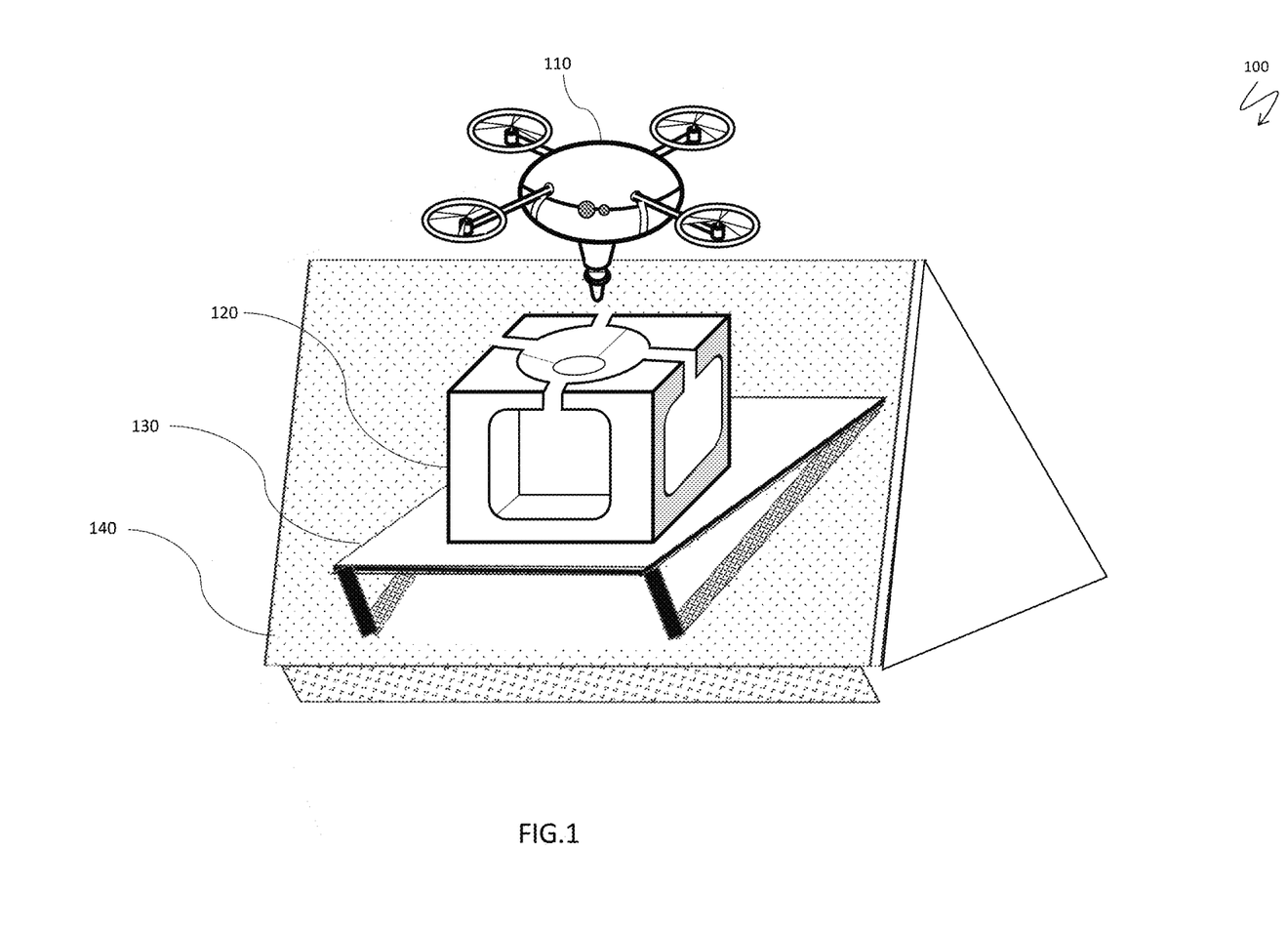
FIG. 1 is a schematic illustration of a mounted landing platform and a mobile security camera, according to an embodiment of the system described herein.

FIG. 1 is a schematic illustration 100 of a mobile security camera 110 and a mounted landing platform 120. The mobile security camera 110 is shown at a landing or departing stage above the landing platform 120, mounted on a mounting plate 130, which, in its turn, is installed on top of a roof 140.

Figure 2A:
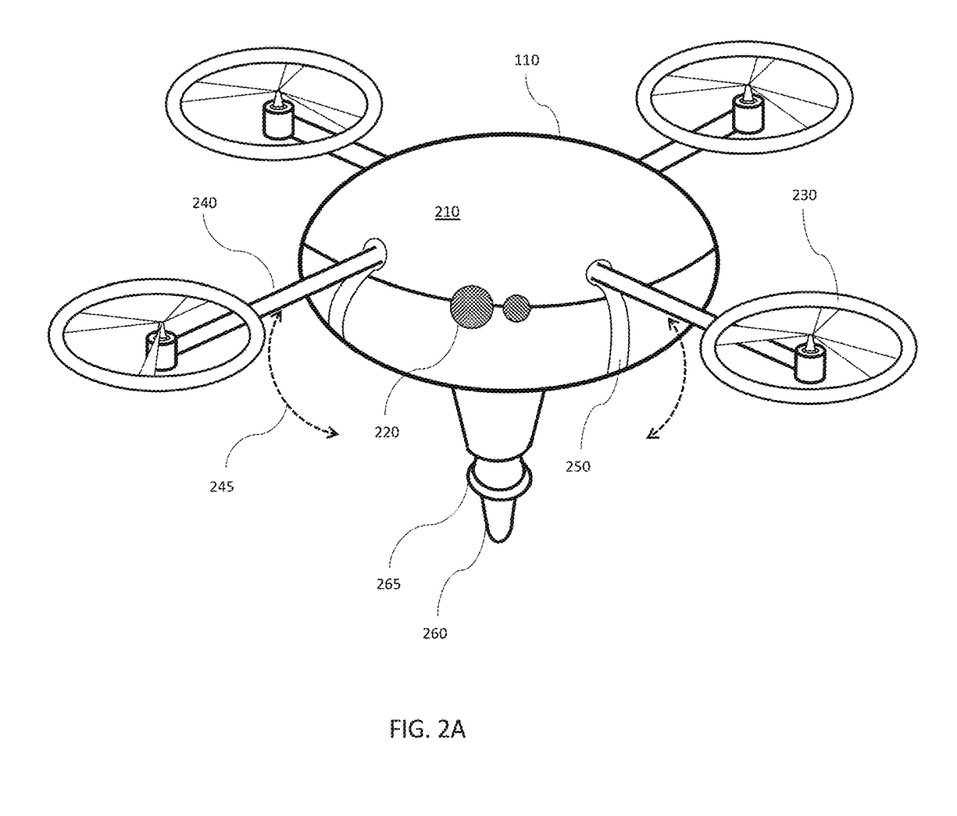
FIGS. 2A-2B are schematic illustrations of a mobile security camera with folding motor supports and a landing platform with slots for motor compartments, according to an embodiment of the system described herein.
Figure 2B:
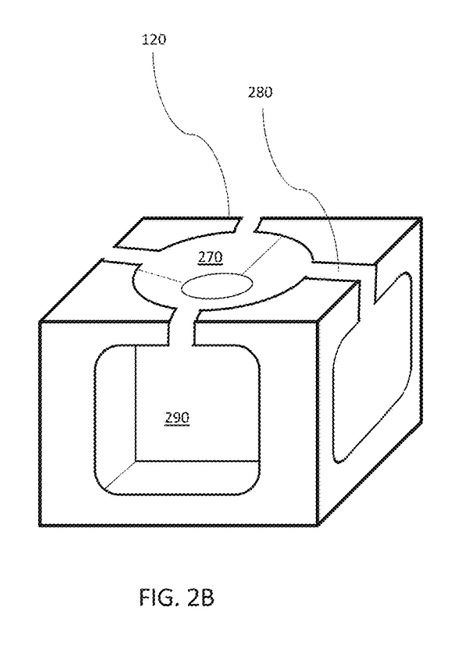

FIGS. 2A-2B are schematic illustrations of the mobile security camera 110 showing folding motor supports 240 and the landing platform 120 with slots for motor components 230.

FIG. 2A shows parts and assembly of the mobile security camera 110, which includes an elliptic body 210 with a camera 220, the motor components 230 with the supports (arms) 240, which may rotate in a direction shown by a dashed arrow 245 and to rest in grooves 250. A landing spike 260 at a bottom part of the mobile security camera 110 carries a charging mechanism 265, as explained elsewhere herein.

FIG. 2B is a schematic illustration that shows the landing platform 120 with slots for the motor components 230. The landing platform 120 includes a landing funnel 270, directing the mobile security camera 110 (not shown in FIG. 2B) in a descent until the mobile security camera 110 stops in a bottom position of the landing platform 120; multiple grooves 280, aligned with the grooves 250 (not shown in FIG. 2B) to allow folding (rotating down and up) of the supports 240 (not shown in FIG. 2B) of motor components 230 (not shown in FIG. 2B) and placement of the motor components 230 in a folded position inside the slots 290 in the landing platform 120.

Figure 3:
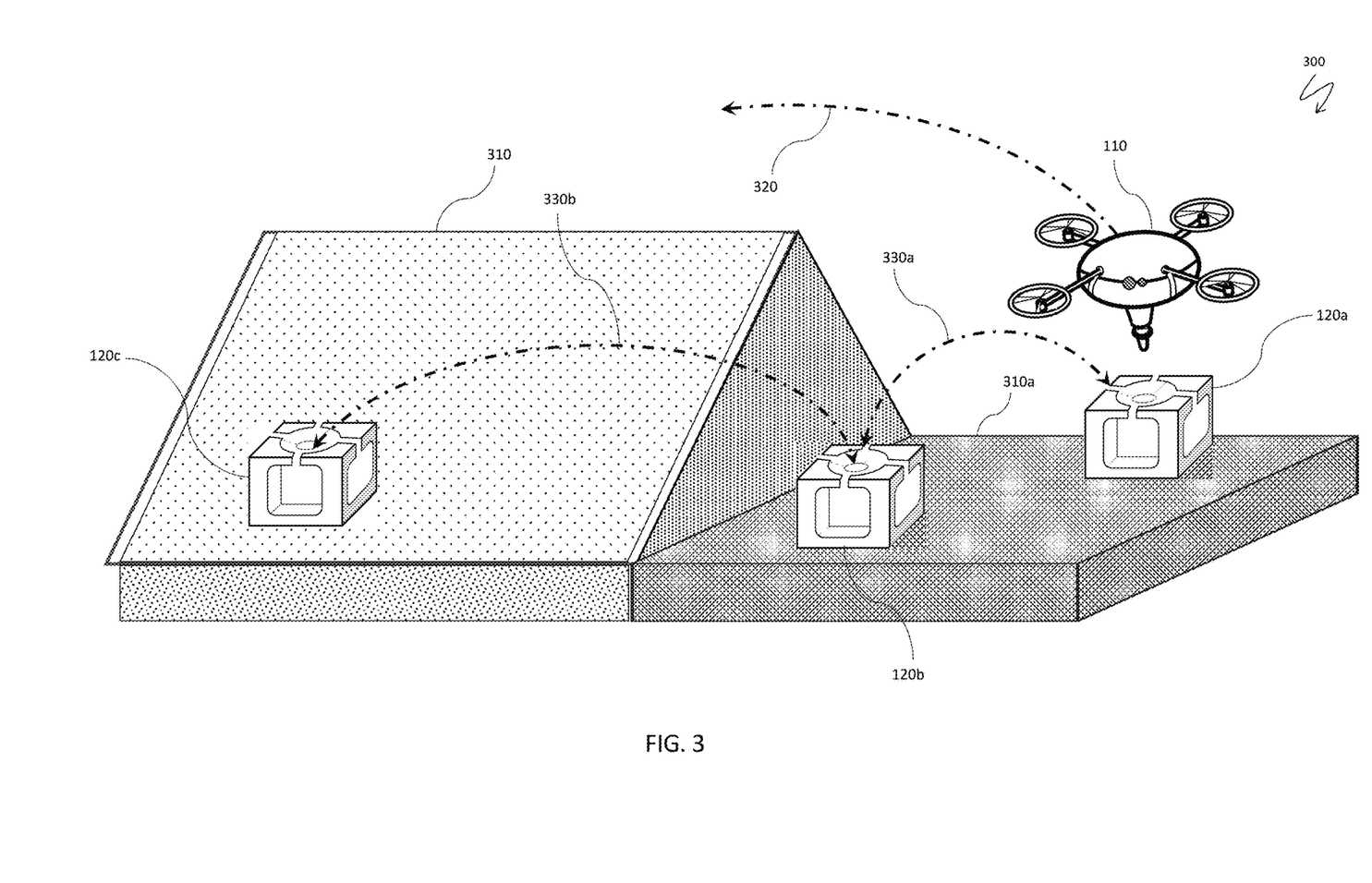
FIG. 3 is a schematic illustration of multiple landing platforms, an autonomous flight and relocations of a mobile security camera between the platforms, according to an embodiment of the system described herein.

FIG. 3 is a schematic illustration 300 of multiple landing platforms 120a, 120b, 120c with autonomous flight and relocation of the mobile security camera 110 between the platforms 120a, 120b, 120c. A multi-level building 310a uses the mobile security camera 110 and the three landing platforms 120a, 120b, 120c. The mobile security camera 110 may take an autonomous flight 320 (in this illustration, from the landing platform 120a) or relocate between the landing platforms 120a, 120b, 120c, as shown by dashed arrows 330a, 330b. The mobile security camera 110 may stay at each of the landing platforms 120a, 120b, 120c for a period of time, serving as a stationary surveillance camera.

Figure 4:
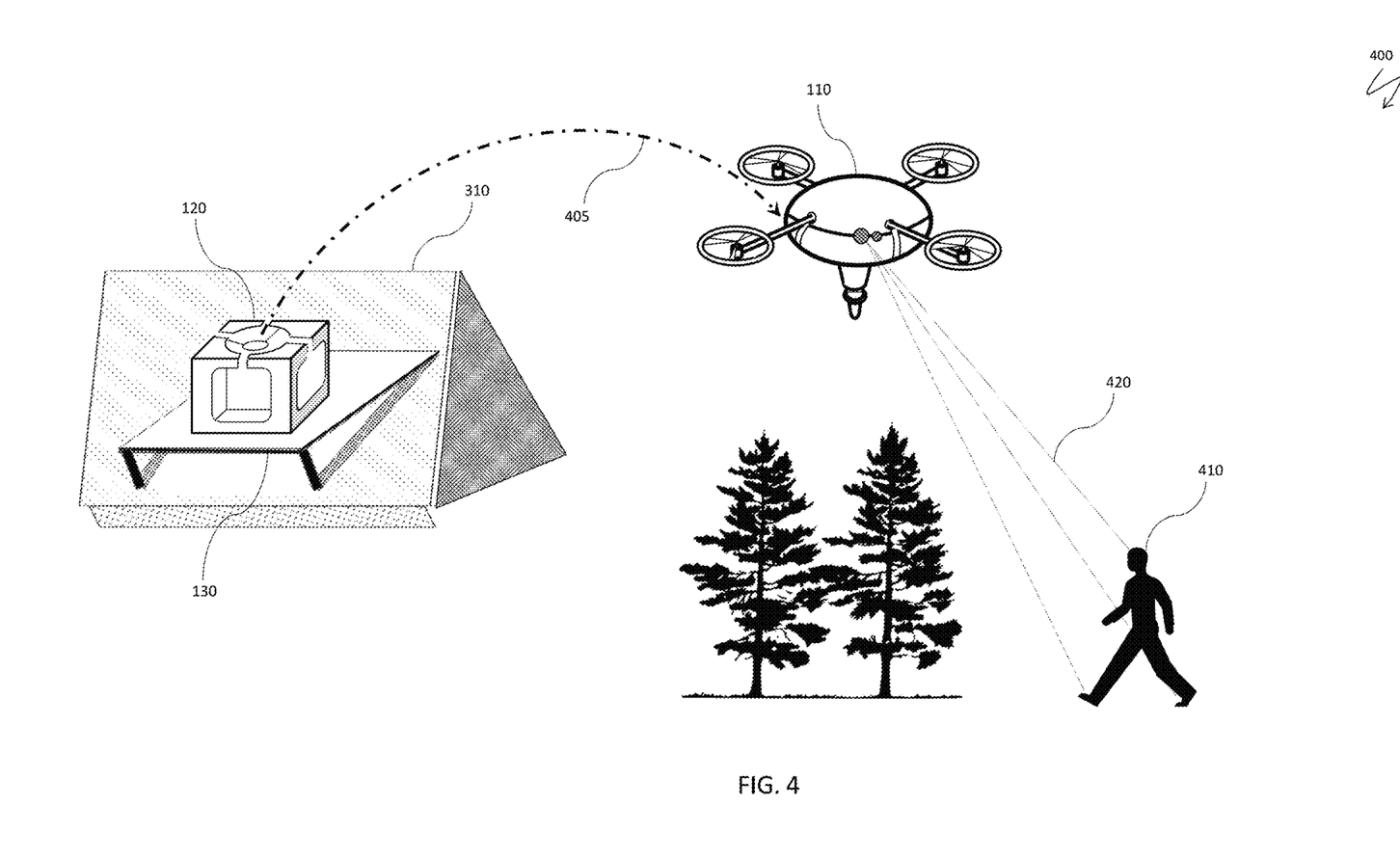
FIG. 4 is a schematic illustration of an autonomous flight and tracking of objects on demand by a mobile security camera, according to an embodiment of the system described herein.

FIG. 4 is a schematic illustration 400 of autonomous flight and object tracking on demand by the mobile security camera 110. A building 310 hosts the landing platform 120 mounted on the mounting plate 130. The security camera 110, initially parked on the landing platform 120 and serving as a stationary surveillance camera while parked, takes an autonomous flight 405 on demand in order to monitor an object (person) 410, such as a potential intruder, shown in a camera view field 420.

Figure 5:
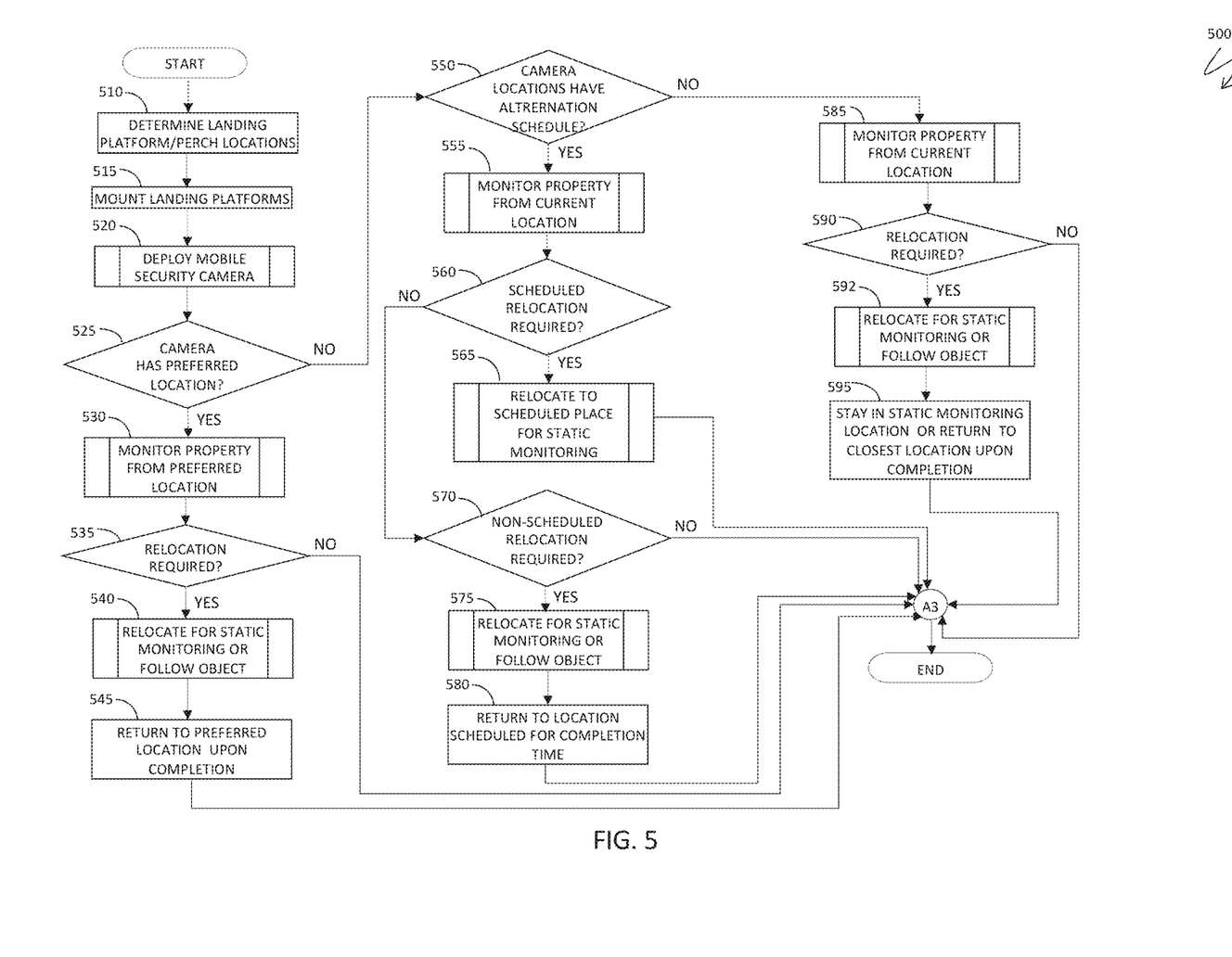
FIG. 5 is a system flow diagram illustrating system functioning in connection with deployment, relocation and property monitoring by mobile security cameras, according to an embodiment of the system described herein.

Referring to FIG. 5, a system flow diagram 500 illustrates system functioning in connection deployment, relocation and property monitoring by mobile security cameras. Processing begins at a step 510, where location(s) of landing platform(s) or perch(es) on a property are determined. After the step 510, processing proceeds to a step 515, where the landing platform(s) are mounted, as explained elsewhere herein (see, for example, FIG. 1 and FIG. 3 and the accompanying text). After the step 515, processing proceeds to a step 520, where a mobile security camera is deployed. After the step 520, processing proceeds to a test step 525, where it is determined whether the mobile camera has a preferred location (among the mounted landing platforms). If so, processing proceeds to a step 530, where the property is monitored by the mobile security camera predominantly from the preferred location. After the step 530, processing proceeds to a test step 535, where it is determined whether a camera relocation is required (which may be due to some unforeseen circumstances rather than a matter of the regular scheduling, such as the monitoring on demand of a new object, as explained in conjunction with FIG. 4). If so, processing proceeds to a step 540, where the mobile security camera is relocated for static monitoring from a different landing platform or for following an object on the property. After the step 540, processing proceeds to a step 545, where the mobile security camera returns to the preferred location, discussed above, upon the completion of a current task. After the step 545, processing is complete; processing is also complete if it was determined at the test step 535 that relocation was not required.

If it is determined at the test step 525 that the mobile security camera does not have a preferred location, processing proceeds to a test step 550, where it is determined whether the camera locations have an alternation schedule. If so, processing proceeds to a step 555, where the mobile security camera initially monitors the property from a current location. After the step 555, processing proceeds to a test step 560, where it is determined whether a scheduled relocation is required. If so, processing proceeds to a step 565, where the mobile security camera is relocated to a scheduled landing platform for static monitoring of the property. After the step 565, processing is complete.

If it is determined at the test step 560 that a scheduled relocation is not required, processing proceeds a test step 570, where it is determined whether a non-scheduled relocation of the mobile security camera is required. If not, processing is complete; otherwise, processing proceeds to a step 575, where the mobile security camera takes an autonomous flight to follow an object on the property or is relocated to a different landing platform for static monitoring. After the step 575, processing proceeds to a step 580, where the mobile security camera returns (or relocates) to a landing platform, scheduled as a destination of the mobile security camera at the time of completion of a previous task. After the step 580, processing is complete.

If it is determined at the test step 550 that a location of the mobile security camera does not have an alternation schedule, processing proceeds to a step 585, where the mobile security camera initially monitors the property from a current location. After the step 585, processing proceeds to a test step 590, where it is determined whether relocation of the mobile security camera is required. If not, processing is complete; otherwise, processing proceeds to a step 592, where the mobile security camera takes an autonomous flight to follow an object on the property or is relocated to a different landing platform for static monitoring. After the step 592, processing proceeds to a step 595, where the system stays in a most recent static monitoring location (landing platform) or returns to a closest landing platform upon completion of an autonomous flight where the mobile security camera follows an object on the property. After the step 595, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functions may vary from the illustrations presented herein. Further, various aspects of the system described herein may be implemented using various applications and may be deployed on various devices, including, but not limited to smartphones, tablets and other mobile computers. Mobile devices with touch screens, such as smartphones and tablets, may use operating system(s) selected from the group consisting of: iOS, Android OS, Windows Phone OS, Blackberry OS and mobile versions of Linux OS. Mobile computers and tablets may also use operating system selected from the group consisting of Mac OS, Windows OS, Linux OS, Chrome OS. Portions of the system may be implemented on cloud servers and communicate with mobile devices and vehicles via wireless connections.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of using at least one mobile security camera to monitor multiple locations, comprising:

providing a plurality of landing platforms for the at least one mobile security camera;

positioning the at least one mobile security camera at a particular one of the landing platforms based on at least one of: periodic, scheduled or random relocation of the at least one mobile security camera;

determining if a relocation of the at least one mobile security camera is required based on monitoring on demand a new object; and if a relocation of the at least one mobile security camera is required, moving the at least one mobile security camera from the particular one of the landing platforms to a different one of the landing platforms for static monitoring from the different one of the landing platforms.

2. A method, according to claim 1, further comprising:

returning the at least one mobile security camera to the particular one of the landing platforms after the at least one mobile security camera follows the detected object.

3. A method, according to claim 1, further comprising:

returning the at least one mobile security camera to a closest one of the landing platforms after the at least one mobile security camera follows the detected object.

4. A method, according to claim 1, further comprising:

moving the at least one mobile security camera from a first one of the landing platforms to a second one of the landing platforms according to an alternation schedule.

5. A method, according to claim 4, wherein the at least one mobile security camera performs static monitoring from the first one of the landing platforms and the second one of the landing platforms.

6. A method, according to claim 1, wherein at least one of the landing platforms includes a charger that cooperates with a charging mechanism on the at least one mobile security camera.

7. A method, according to claim 6, wherein the at least one mobile security camera lands at different ones of the plurality of landing platforms to charge before taking flight again.

8. A method, according to claim 6, wherein the at least one mobile security camera includes a landing spike on a bottom portion thereof, the landing spike including the charging mechanism.

9. A method, according to claim 8, wherein the landing platforms include a funnel that accommodates the landing spike.

10. A method, according to claim 1, wherein at least one of the landing platforms is mounted on a mounting plate that is mounted on a roof of a building.

11. A method, according to claim 1, wherein the at least one mobile security camera includes motor components with supports that rotate to rest in grooves of the at least one mobile security camera.

12. A method, according to claim 11, wherein the landing platforms include slots for the motor components.

13. A method, according to claim 1, further comprising:

the at least one mobile security camera taking an autonomous flight to follow the new object.

14. A non-transitory computer-readable medium containing software that uses at least one mobile security camera to monitor multiple locations, each of the locations having a landing platform for the at least one mobile security camera, the software comprising:

executable code that positions the at least one mobile security camera at a particular one of the landing platforms based on at least one of: periodic, scheduled or random relocation of the at least one mobile security camera;

executable code that determines if a relocation of the at least one mobile security camera is required based on monitoring on demand a new object; and executable code that, if a relocation of the at least one mobile security camera is required, moves the at least one mobile security camera from the particular one of the landing platforms for static monitoring from the different one of the landing platforms.

15. A non-transitory computer-readable medium, according to claim 14, further comprising:

executable code that returns the at least one mobile security camera to the particular one of the landing platforms after the at least one mobile security camera follows the detected object.

16. A non-transitory computer-readable medium, according to claim 14, further comprising:

executable code that returns the at least one mobile security camera to a closest one of the landing platforms after the at least one mobile security camera follows the detected object.

17. A non-transitory computer-readable medium, according to claim 14, further comprising:

executable code that moves the at least one mobile security camera from a first one of the landing platforms to a second one of the landing platforms according to an alternation schedule.

18. A non-transitory computer-readable medium, according to claim 17, further comprising:

executable code that causes the at least one mobile security camera to perform static monitoring from the first one of the landing platforms and the second one of the landing platforms.

19. A non-transitory computer-readable medium, according to claim 14, further comprising:

executable code that causes the at least one mobile security camera to land at different ones of the plurality of landing platforms to charge before taking flight again.

20. A non-transitory computer-readable medium, according to claim 14, further comprising:

executable code that causes the at least one mobile security camera to take an autonomous flight to follow the new object.

* * * * *